United States Patent
Wu

(10) Patent No.: US 8,917,363 B2
(45) Date of Patent: Dec. 23, 2014

(54) ANTI-PEEPING PRIVACY DEVICE

(71) Applicant: BenQ Materials Corporation, Taoyuan County (JP)

(72) Inventor: Fung-Hsu Wu, Taoyuan County (JP)

(73) Assignee: BenQ Materials Corporation, Taoyuan County (TW)

( * ) Notice: Subject to any disclaimer, the term of this patent is extended or adjusted under 35 U.S.C. 154(b) by 88 days.

(21) Appl. No.: 13/845,112

(22) Filed: Mar. 18, 2013

(65) Prior Publication Data

US 2014/0240627 A1  Aug. 28, 2014

(30) Foreign Application Priority Data

Feb. 25, 2013 (TW) ............... 102106529 A

(51) Int. Cl.
*G02F 1/1335* (2006.01)
*G02F 1/13* (2006.01)

(52) U.S. Cl.
CPC ........ *G02F 1/1323* (2013.01); *G02F 1/133504* (2013.01)
USPC ................. 349/16; 349/74; 349/112

(58) Field of Classification Search
None
See application file for complete search history.

(56) References Cited

U.S. PATENT DOCUMENTS

| 5,877,829 A * | 3/1999 | Okamoto et al. ............... 349/74 |
| 2005/0195342 A1 * | 9/2005 | Grip ................................ 349/74 |
| 2007/0052879 A1 * | 3/2007 | Uehara et al. ................... 349/56 |
| 2008/0007677 A1 * | 1/2008 | Enomoto ..................... 349/106 |

* cited by examiner

*Primary Examiner* — Richard Kim
(74) *Attorney, Agent, or Firm* — CKC & Partners Co., Ltd.

(57) ABSTRACT

An anti-peeping privacy device is provided, including a polarizing element, a liquid crystal member and a diffusing element. The liquid crystal member is disposed on the polarizing element. The diffusing element is disposed on the liquid crystal member, comprising a transparent layer and a liquid crystal layer. The transparent layer having a refractive index and adjacent to the liquid crystal member includes a plurality of concave-convex stripe microstructures on the top side thereof, wherein the plurality of concave-convex stripe microstructure is arranged in a direction substantially orthogonal to the polarized light. The liquid crystal layer disposed on the concave-convex stripe microstructures of the transparent resin layer.

10 Claims, 9 Drawing Sheets

ANTI-PEEPING PRIVACY DEVICE

CROSS-REFERENCE TO RELATED APPLICATION

This application claims the priority benefit of Taiwan application serial no. 102106529, filed on Feb. 25, 2013, the full disclosure of which is incorporated herein by reference.

BACKGROUND

1. Field of the Invention

The invention relates generally to a light control device, and more particularly to an anti-peeping privacy device designed according to the light scattering theory.

2. Description of Related Art

With the raise of consciousness of personal privacy, the French windows in a house almost have been all applied with an anti-reflection film against peeping. However, the anti-reflection film normally has insufficient light transmittance and poor weatherability, which results in occurrence of discoloration or uneven color distribution after the application for a certain period of time.

Because the anti-reflection film fails to meet the request in use, the study on smart windows has been becoming a popular topic of research. For example, a commercialized electrochromic window is implemented by sandwiching two substrates and polymer dispersed liquid crystal (PDLC) between two substrates, which the PDLC are liquid crystal droplets dispersed in the polymer resin. When the electric field is applied, the alignment of PDLC would be changed so as to adjust the light transmittance of the window. But so far, the mass production of the electrochromic windows has not been realized because of the issues of poor liquid crystal dispersion and price concern.

As a result, a novel privacy device against peeping is still desired in the art.

SUMMARY

According to the aforementioned disadvantages, the present invention is to provide an anti-peeing privacy device designed based on the light scattering theory.

According to an aspect of the present invention, an anti-peeing privacy device comprises of a polarizing element; a liquid crystal member and a diffusing element. The polarizing element is for polarizing the incident light to the polarized light. The liquid crystal member disposed on the polarizing element, comprises two transparent substrates, liquid crystal interposed therebetween and a driving unit for controlling the direction of the polarized light. The diffusing element disposed on the liquid crystal member comprises a transparent resin layer and a liquid crystal layer. The transparent resin layer having a refractive index and adjacent to the liquid crystal member, comprises a plurality of concave-convex stripe microstructures on the top side thereof, wherein the concave-convex stripe microstructures is arranged in a direction substantially orthogonal to the polarized light. The liquid crystal layer is disposed on the concave-convex stripe microstructures of the transparent resin layer, and the liquid crystal layer has an extraordinary refractive index parallel to the arrangement direction of concave-convex stripe microstructures and an ordinary refractive index orthogonal to the arrangement direction of concave-convex stripe microstructures.

According to another aspect of the present invention, the polarized light is 90 degree polarized light and the liquid crystal member is a vertical alignment cell.

According to another aspect of the present invention, the polarized light is 135 degree polarized light and the liquid crystal member is a twisted nematic cell.

In an embodiment of the present invention, the transparent resin layer is made of a thermo-curable resin or a UV-curable resin.

In another embodiment of the present invention, the pitch between every two of the concave-convex stripe microstructures is in the range of 10 μm to 1,000 μm.

In another embodiment of the present invention, the height of the concave-convex stripe microstructures is in the range of 10 μm to 1000 μm.

According to yet another embodiment of the invention, the width of the concave-convex stripe microstructures is in the range of 10 μm to 1000 μm.

According to further another embodiment of the invention, the cross-sectional shape of the concave-convex stripe microstructures is selected from the group consisting of triangular, semicircle, semi-elliptical, quadrilateral and a combination thereof.

According to further another embodiment of the invention, the liquid crystal material of the liquid crystal layer is a photopolymerizable liquid crystal.

According to further another embodiment of the invention, the polarizing element is a polarizer.

The above and other aspects of the invention will better understand with regard to the following detail description of the preferred but non-limiting embodiment(s). The following description is made with reference to the accompanying drawings.

BRIEF DESCRIPTION OF THE DRAWINGS

FIGS. 2A to 2E show a schematic diagram for a manufacturing method of a embodiment of the present invention.

DETAILED DESCRIPTION

Please note the drawings shown in the Figures are for illustrative purpose only and not to scale.

Figure 1:
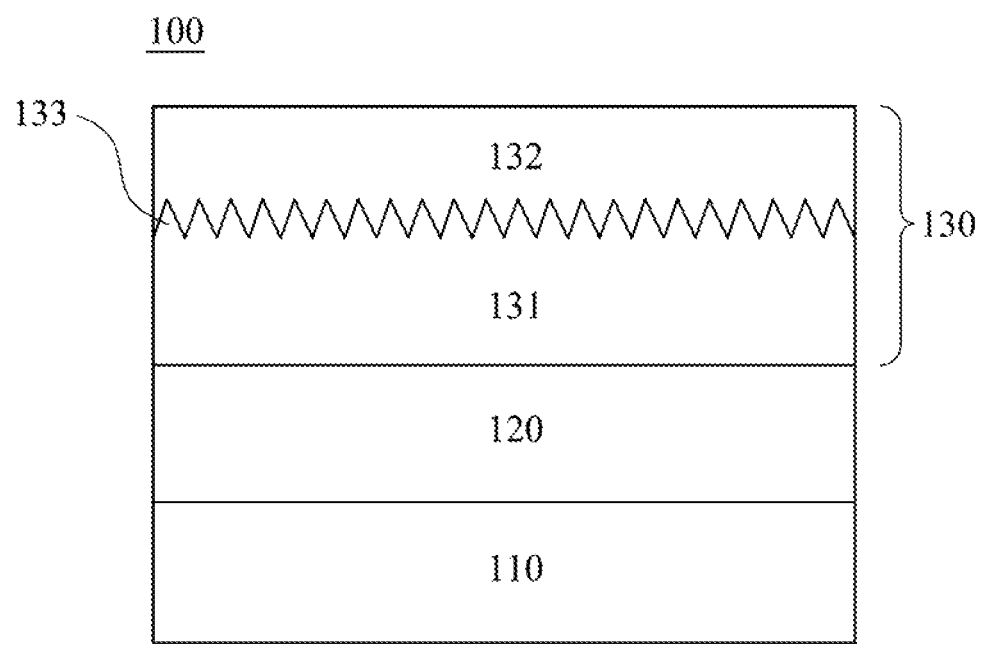
FIG. 1 shows a cross-sectional schematic diagram of an anti-peeping privacy device of the embodiment of the present invention.

Referring to FIG. 1, a cross-sectional schematic diagram of an anti-peeping privacy device of the preferred embodiment of the invention is shown. The anti-peeping privacy device 100 comprises a polarizing element 110; a crystal liquid member 120, and a diffusing element 130. The diffusing element 130 further comprises of a transparent resin layer 131 and a liquid crystal layer 132.

The polarizing element 110 is a polarizer for polarizing the incident light to the polarized light. The manufacturing method of the polarizing element is dyeing a polyvinyl alcohol (PVA) film by bringing it into several tanks with dye solutions containing iodine, potassium iodide, boric acid and water and stretching it at the same time. After drying process, the PVA film with specific optical performance, such as, light transmittance, polarization and hue are obtained. In the final step, a polarizer is generated by laminating protection films on each side of the PVA film. The protection film is selected from the group of polyethylene terephthalate (PET), polycarbonate (PC), triacetry cellulose (TAC), polymethyl methacrylate (PMMA) and cyclo-olefin polymer (COP). The protection film further provides the function such as hard-coating, anti-UV, anti-reflection, anti-glare and anti-IR. In another embodiment of the present invention, the light transmittance of the polarizer is greater than 40.0%. In further another embodiment of the present invention, the polarization is greater than 99.9%. In addition to the iodine type polarizer, a dye type polarizer film or a metal grating filter are also be used to replace the iodine type polarizer.

The liquid crystal member 120, disposed on the polarizing element 110, comprises of two transparent substrates, liquid crystal interposed therebetween and a driving unit for controlling the direction of the polarized light. The liquid crystal member is such as a vertical alignment cell or a twisted nematic cell. The transparent substrate is, for example a glass.

The diffusing element 130, disposed on the liquid crystal member 120, further comprises a transparent resin layer 131 and a liquid crystal layer 132. The transparent resin layer 131 having a refractive index and adjacent to the liquid crystal member comprises a plurality of concave-convex stripe microstructures on the top side thereof. The cross-sectional shape of the concave-convex stripe microstructures is selected from the group consisting of triangular, semicircle, semi-elliptical, quadrilateral and a combination thereof. Moreover, the transparent resin layer is made of a thermocurable resin or a UV-curable resin, for example, selected from the group of acrylic resin, silicone resin, polyurethane resin and the epoxy resin. The liquid crystal material of liquid crystal layer 132 is a polymerizable liquid crystal, such as a photopolymerizable liquid crystal.

Referring to FIGS. 2A to 2E, schematic diagrams for a manufacturing method of a preferred embodiment of the present invention are shown. The base substrate 231 is provided. The base substrate is, for example, a releasing film.

Figures 2A, 2B, 2C:
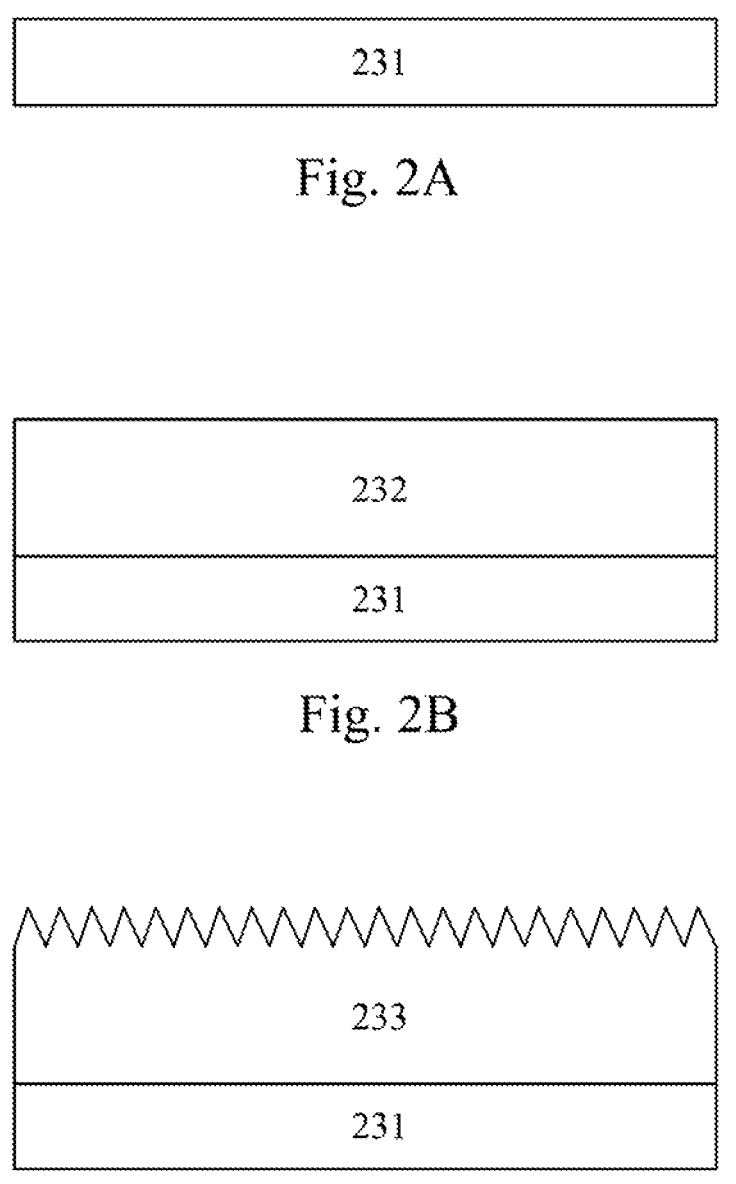

Then, as indicated in FIG. 2B, a curable resin 232 is coated on the base substrate 231. The curable resin 232 is coated by a process known to an artisan skilled in the art, such as die coating or gravure coating. The curable resin 232 is a UV curable resin or a thermo-curable resin, such as acrylic resin, silicone resin, polyurethane or epoxy resin.

After the curable resin is coated, the curable resin is embossed with a predetermined pattern to form a plurality of concave-convex stripe microstructures thereon. The embossing treatment is effected by such as an embossing roller or an embossing member.

Then, the concave-convex stripe microstructures are conducted a curing treatment. The curing treatment is conducted by UV curing or thermal curing treatment to form a transparent resin layer 233, as shown in FIG. 2C.

Figure 2D:
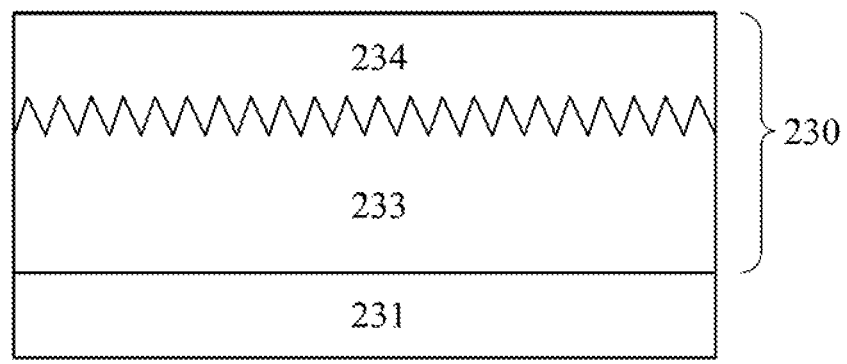

A liquid crystal material 234 was coated on the concave-convex stripe microstructures of the transparent resin layer 233 to form a liquid crystal layer 234, as shown in FIG. 2D.

After conducting heating treatment, the diffusing element 230 with a transparent resin layer 233 and a liquid crystal layer 234 is obtained. In another embodiment of the manufacturing method of the present invention, the liquid crystal material is a polymerizable liquid crystal, such as a photopolymerizable liquid crystal, for example, RMS series liquid crystal (available from Merck Display Tech Ltd, Taiwan).

Figure 2E:
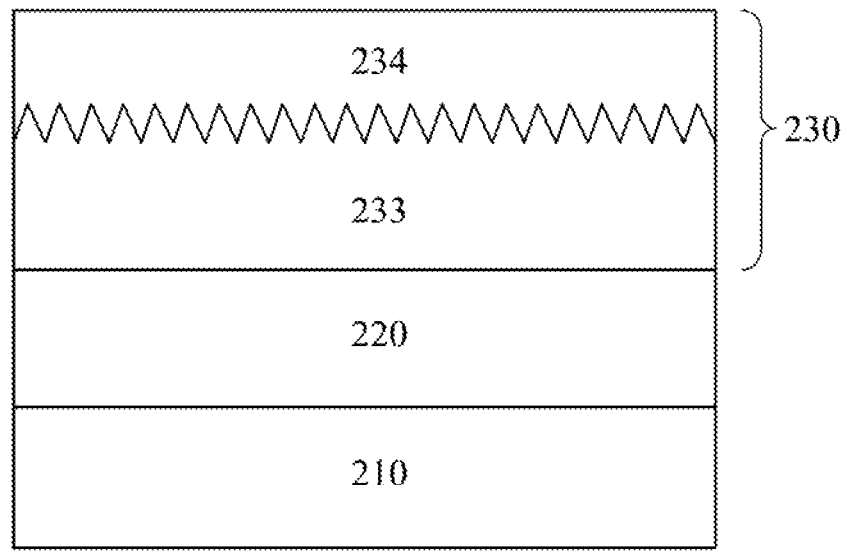

In the final step, the diffusing element 230 and the polarizing element 210 are laminated on the each side of liquid crystal member 220 respectively to obtain an anti-peeping privacy device of the present invention, as shown in FIG. 2E.

Figure 3:
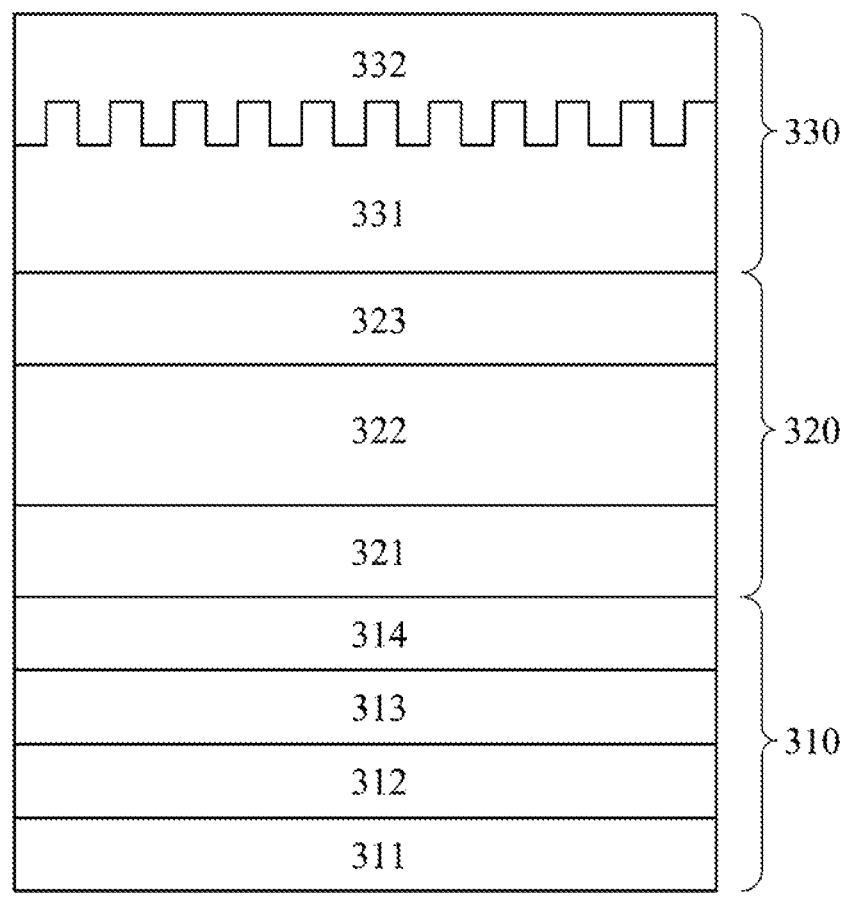
FIG. 3 shows a cross-sectional schematic diagram of an anti-peeping privacy device of the embodiment of the present invention.

Referring to FIG. 3, a cross-sectional schematic diagram of an anti-peeping privacy device of another preferred embodiment of the invention is shown. The anti-peeping privacy device 300 comprises a polarizing element 310; a crystal liquid member 320 disposed on the polarizing element 310, and a diffusing element 330 disposed on the crystal liquid member 320.

The polarizing element 310 is a polarizer, comprising of a PVA film 312 and two protection films 311 and 313 disposed on each sides of PVA film respectively. The two protection films 311 and 313 are consisted of triacetyl cellulose. The polarizer has a polarization axis to polarize the incident light to the polarized light. In a preferred embodiment of the present invention, the polarization axis of the polarizer is 90 degree. The definition of 90 degree is an included angle between the polarization axis and the horizontal direction.

The liquid crystal member 320 is a vertical alignment cell, comprising two glass substrates 321 and 323, the vertical alignment liquid crystal 322 interposed therebetween and a driving unit for controlling the direction of the polarized light.

The polarizing element 310 further includes an adhesive layer 314 for lamination with a liquid crystal layer 320. The adhesive layer, for example, is pressure sensitive adhesive. In another embodiment of the present invention, the adhesive layer is UV curable adhesive.

The diffusing element 330, disposed on the liquid crystal member 320, further comprises of a transparent resin layer 331 and a liquid crystal layer 332. The transparent resin layer 331 having a refractive index and adjacent to the liquid crystal member, comprises a plurality of concave-convex stripe microstructures on the top side thereof. In one embodiment of the invention, the transparent resin layer is consisted of an acrylic resin with a refractive index of 1.6. The liquid crystal layer 332 disposed on the concave-convex stripe microstructures of the transparent resin layer, wherein the liquid crystal layer has an extraordinary refractive index parallel to the arrangement direction of concave-convex stripe microstructures and an ordinary refractive index orthogonal to the arrangement direction of concave-convex stripe microstructures, wherein the extraordinary refractive index and the ordinary refractive index of the liquid crystal layer are different and the refractive index of the transparent resin layer is substantially the same as the ordinary refractive index of the liquid crystal layer. In another embodiment of the invention, the liquid crystal material of the liquid crystal layer 332 is a photopolymerizable liquid crystal with an extraordinary refractive index ($n_e$) of 1.5 and an ordinary refractive index ($n_o$) of 1.6.

Figure 4:
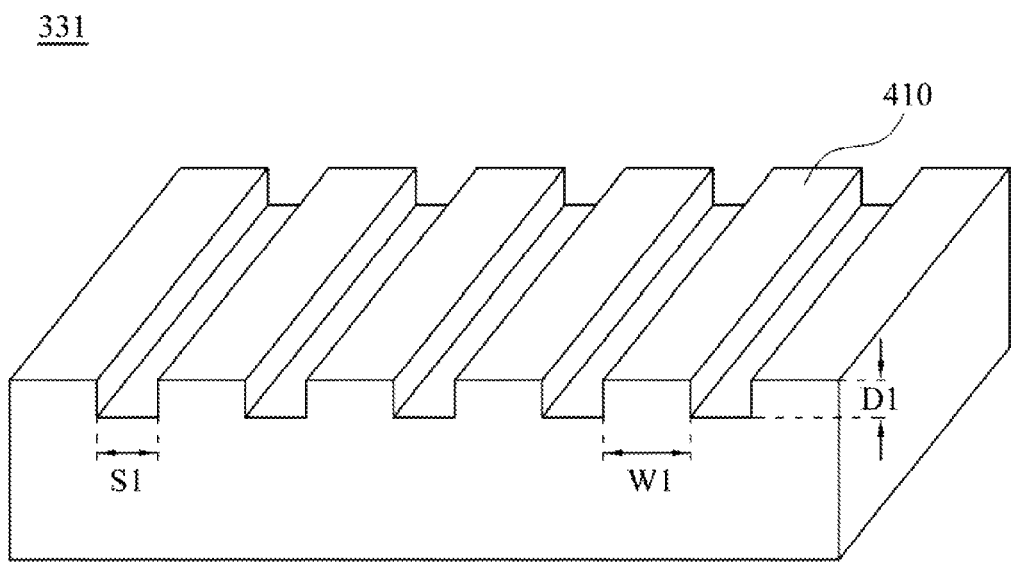
FIG. 4 shows an enlarged view of the transparent resin layer of FIG. 3.

FIG. 4 shows an enlarged view of the transparent resin layer 331 of FIG. 3. The concave-convex stripe microstructures 410 of the transparent resin layer are arranged in parallel and arranged in a direction orthogonal to the polarized light. The cross-sectional shape of the concave-convex stripe microstructures 410 is quadrilateral. Moreover, the width W1 of the concave-convex stripe microstructures is in the range of 10 μm to 1,000 μm, preferably in 200 μm to 600 μm and more preferably in 300 μm to 500 μm. The height D1 of the concave-convex stripe microstructures 410 is in the range of 10 μm to 1,000 μm, preferably in 20 μm to 500 μm and more preferably in 100 μm to 200 μm. The pitch S1 between every two of the concave-convex stripe microstructures 410 is in the range of 10 μm to 1,000 μm, preferably in 100 μm to 500 μm and more preferably in 200 μm to 300 μm.

As aforementioned above, the concave-convex stripe microstructures, the refractive index of the transparent resin layer, the extraordinary refractive index and the ordinary refractive index of the liquid crystal layer are designed specifically for controlling the emitting way of the polarized light from the anti-peeping privacy device. The detail illustrations of the anti-peeping privacy device of the present invention are described as below.

Referring to FIG. 3, the incident light passes through the polarizing element for generating the 90 degree polarized light. The 90 degree polarized light would maintain the original direction when turning off the driving unit of the liquid crystal member. Then, the 90 degree polarized light passes through the transparent resin layer with the concave-convex stripe microstructures thereon. Because of the arrangement direction of the concave-convex stripe microstructures is orthogonal to the 90 degree polarized light and the refractive index of the transparent resin layer is the same as the ordinary refractive index of the liquid crystal layer, the scattering phenomenon of the 90 degree polarized light hasn't occurred at the interface between the concave-convex stripe microstructures and the liquid crystal layer. As a result, the anti-peeping privacy device is still on a transparent state.

On the contrary, when turning on the driving unit of the liquid crystal member, the polarized light would be transformed to the 0 degree polarized light. Then, the 0 degree polarized light pass through the transparent resin layer with a plurality of the concave-convex stripe microstructures thereon and the liquid crystal layer in sequence. Because of the arrangement direction of the concave-convex stripe microstructures is parallel to the 0 degree polarized light and the extraordinary refractive index of the liquid crystal layer is different from the refractive index of the transparent resin layer, the scattering phenomenon would occur at the interface between the concave-convex stripe microstructures and the liquid crystal layer. As a result, the anti-peeping privacy device becomes opaque and the image behind the anti-peeping privacy device becomes fuzzy and unclear. The privacy effect of the anti-peeping privacy device of the present invention would be obtained.

Figure 5:
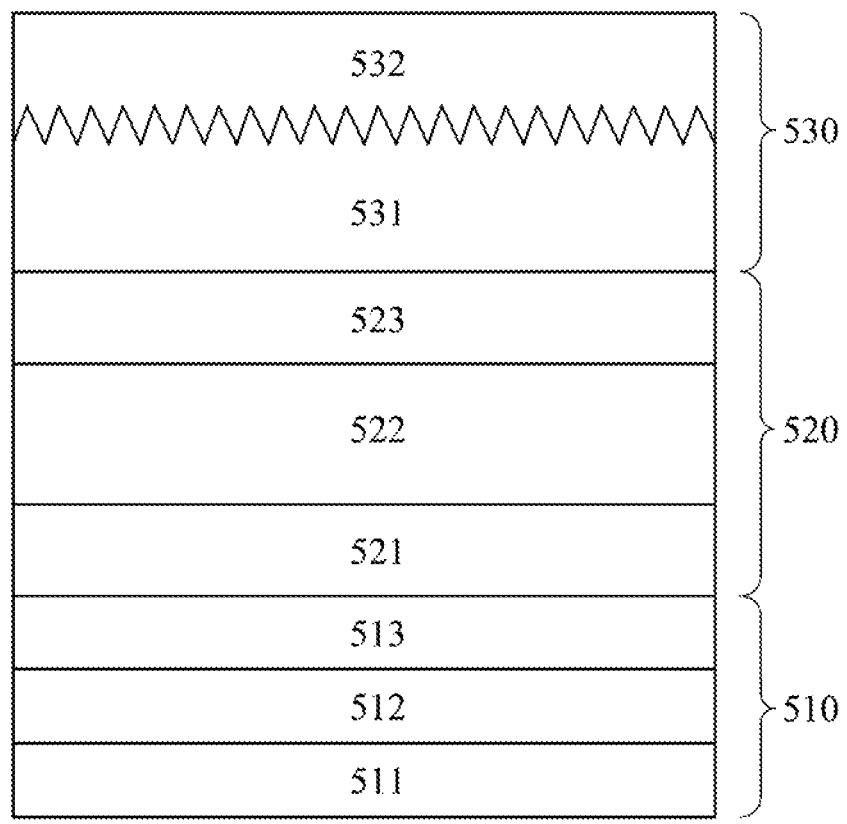
FIG. 5 shows a cross-sectional schematic diagram of an anti-peeping privacy device of the embodiment of the present invention.

Referring to FIG. 5, a cross-sectional schematic diagram of an anti-peeping privacy device of another preferred embodiment of the invention is shown. The anti-peeping privacy device 500 comprises a polarizing element 510; a crystal liquid member 520 disposed on the polarizing element 510, and a diffusing element 530 disposed on the crystal liquid member 520.

The polarizing element 510 is a polarizer, comprising of a PVA film 512 and a protection films 511 disposed on one side of the PVA film. The protection film 511 is polyethylene terephthalate, located on the outer side of the privacy device. The polarizer has a polarization axis for polarizing the incident light to the polarized light. In another preferred embodiment of the present invention, the polarization axis of the polarizer is 135 degree. The definition of 135 degree is an included angle between the polarization axis and the horizontal direction.

The liquid crystal member 520 is a twisted nematic cell, comprising two glass substrates 521 and 523, twisted nematic liquid crystals 522 interposed therebetween and a driving unit for controlling the direction of the polarized light.

The polarizing element 510 further includes an adhesive layer 513 for lamination with a liquid crystal layer 520. The adhesive layer, for example, is a UV curable adhesive.

The diffusing element 530, disposed on the liquid crystal member 520, further comprises of a transparent resin layer 531 and a liquid crystal layer 532. The transparent resin layer 531 has a refractive index and is adjacent to the liquid crystal member, and comprises a plurality of concave-convex stripe microstructures on the top side thereof. In this embodiment of the invention, the transparent resin layer is consisted of an acrylic resin with a refractive index of 1.6. The liquid crystal layer 532 is a photopolymerizable liquid crystal with an extraordinary refractive index ($n_e$) of 1.5 and an ordinary refractive index ($n_o$) of 1.6.

Figure 6:
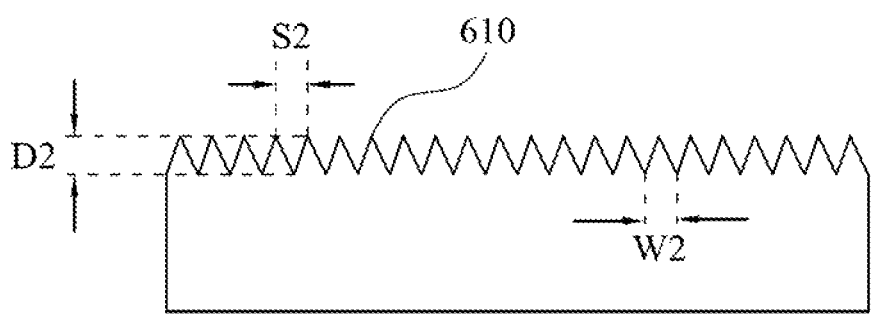
FIG. 6 shows an enlarged view of the transparent resin layer of FIG. 5.

FIG. 6 shows an enlarged view of the transparent resin layer 531 of FIG. 5. The concave-convex stripe microstructures 610 of the transparent resin layer are arranged in parallel and arranged in a direction orthogonal to the polarized light. The cross-sectional shape of the concave-convex stripe microstructures 610 is triangular.

Wherein, the width W2 of the concave-convex stripe microstructures 610 is in the range of 10 μm to 1,000 μm, preferably in 200 μm to 600 μm and more preferably in 300 μm to 500 μm. The height D2 of the concave-convex stripe microstructures 610 is in the range of 10 μm to 1,000 μm, preferably in 20 μm to 500 μm and more preferably in 100 μm to 200 μm. The pitch S2 between every two of the concave-convex stripe microstructures 610 is in the range of 10 μm to 1,000 μm, preferably in 100 μm to 500 μm and more preferably in 200 μm to 300 μm.

Figure 7:
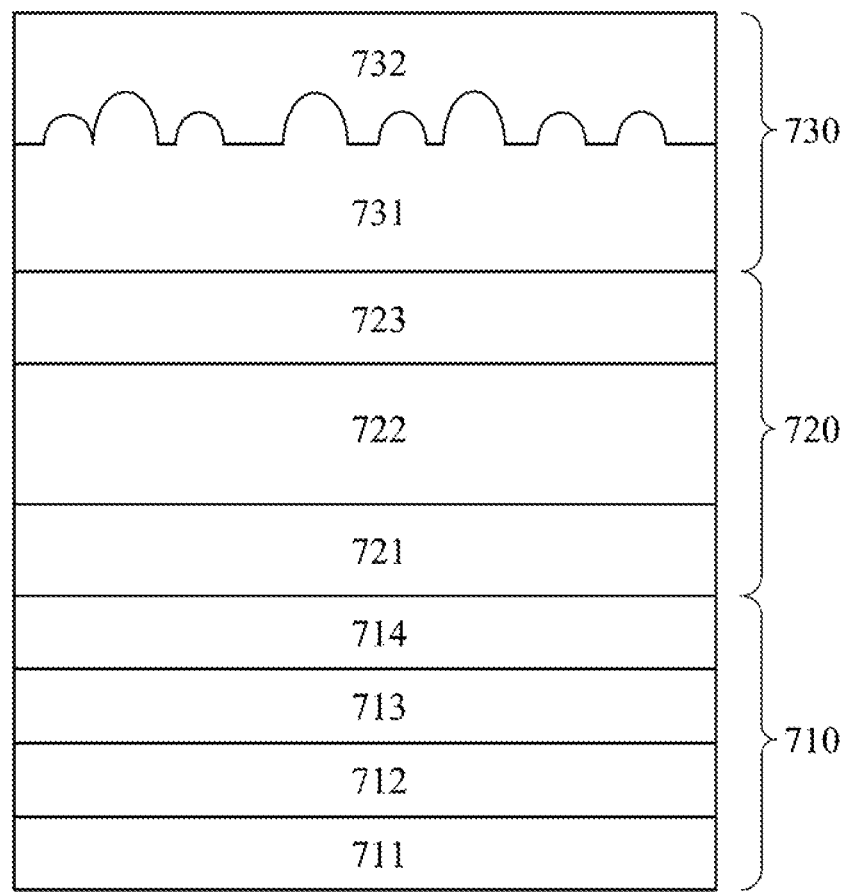
FIG. 7 shows a cross-sectional schematic diagram of an anti-peeping privacy device of the embodiment of the present invention.

Referring to FIG. 7, a cross-sectional schematic diagram of an anti-peeping privacy device of another preferred embodiment of the invention is shown. The anti-peeping privacy device 700 is similar with anti-peeping privacy device 500, the differences are the polarizing element 710 and the transparent resin layer 731 of the diffusing element 730.

The anti-peeping privacy device 700 comprises a polarizing element 710; a crystal liquid member 720 disposed on the polarizing element 710, and a diffusing element 730 disposed on the crystal liquid member 720.

The polarizing element 710 is a polarizer, comprising of a PVA film 713 and a protection film 712. The protection film 712 is consisted of triacetyl cellulose, located on the outer side of the privacy device. The protection film 712 further includes the hard-coating layer 711 thereon to enhance scratch resistance of the protection film 712.

The polarizing element 710 further includes an adhesive layer 714 for lamination with a liquid crystal member 720. The adhesive layer, for example, is a UV curable adhesive.

In an aspect of the present invention, the protection film further include the function selected from the group of hardcoating, anti-UV, anti-reflection, ant-glare and anti-1R.

The crystal member 720 comprises two glass substrates 721, 723, twisted nematic liquid crystals 722 interposed therebetween and a driving unit for controlling the direction of the polarized light.

The diffusing element 730, disposed on the liquid crystal member 720, further comprises of a transparent resin layer 731 and a liquid crystal layer 732.

Figure 8:
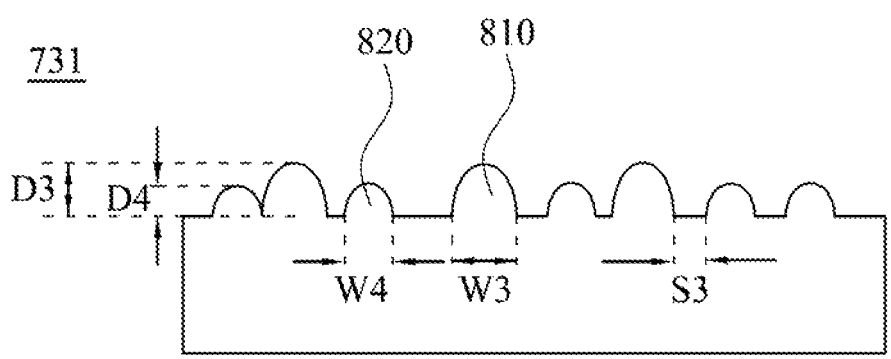
FIG. 8 shows an enlarged view of the transparent resin layer of FIG. 7.

FIG. 8 shows an enlarged view of the transparent resin layer 731 of FIG. 7. The concave convex stripe microstructures 810 and 820 of the transparent resin layer are arranged in parallel but interlaced irregularly. The cross-sectional shape of the concave-convex stripe microstructures 810 and 820 is semi-elliptical. Wherein, the width W4 of the concave-convex stripe microstructures 820 is in the range of 10 μm to 1,000 μm, preferably in 200 μm to 600 μm and more preferably in 300 μm to 500 μm. The width W3 of the concave-convex stripe microstructures 810 is in the range of 10 μm to 1,000 μm, preferably in 200 μm to 600 μm and more preferably in 300 μm to 500 μm. The height D4 of the concave-convex stripe microstructures 820 is in the range of 10 μm to 1,000 μm, preferably in 20 μm to 500 μm and more preferably in 100 μm to 200 μm. The height D3 of the concave-convex stripe microstructures 810 is in the range of 10 μm to 1,000 μm, preferably in 20 μm to 500 μm and more preferably in 100 μm to 200 μm. The pitch S3 between every two of the concave-convex stripe microstructures is in the range of 10 μm to 1,000 μm, preferably in 100 μm to 500 μm and more preferably in 200 μm to 300 μm.

As aforementioned above, the specific width, height and pitch of concave-convex stripe microstructures are designed for generation of excellent light scattering phenomenon at the interface between the transparent resin layer and liquid crystal layer. In this way, the anti-peeping privacy device of the iso present invention is capable of providing an excellent privacy performance. If the specific range of width, height and pitch of concave-convex stripe microstructures exceed the present invention described, the worse light scattering phenomenon and unfavorable privacy performance would occur.

The invention provides an anti-peeping privacy device designed according to the light scattering theory and more particularly, user can control the incept light by himself. In addition, the anti-peeping privacy device of the present invention can be further applied on a window in the conference room or other anti-peeping privacy related applications.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An anti-peeping privacy device, comprising:
    a polarizing element for polarizing the incident light to the polarized light;
    a liquid crystal member disposed on the polarizing element, comprising two transparent substrates, liquid crystals interposed therebetween and a driving unit for controlling the direction of the polarized light; and
    a diffusing element disposed on the liquid crystal member, comprising
    a transparent resin layer having a refractive index and adjacent to the liquid crystal member, comprising a plurality of concave-convex stripe microstructures on the top side thereof, wherein the concave-convex stripe microstructures are arranged in a direction substantially orthogonal to the polarized light; and
    a liquid crystal layer disposed on the concave-convex stripe microstructures of the transparent resin layer, the liquid crystal layer having an extraordinary refractive index parallel to the arrangement direction of concave-convex stripe microstructures and an ordinary refractive index orthogonal to the arrangement direction of concave-convex stripe microstructures,
    wherein the extraordinary refractive index and the ordinary refractive index of the liquid crystal layer are different and the refractive index of the transparent resin layer is substantially the same as the ordinary refractive index of the liquid crystal layer.

2. The anti-peeping privacy device according to claim 1, wherein the polarized light is 90 degree polarized light and the liquid crystal member is a vertical alignment cell.

3. The anti-peeping privacy device according to claim 1, wherein the polarized light is 135 degree polarized light and the liquid crystal member is a twisted nematic cell.

4. The anti-peeping privacy device according to claim 1, wherein the transparent resin layer is a thermo-curable resin or a UV-curable resin.

5. The anti-peeping privacy device according to claim 1, wherein the pitch between every two of the concave-convex stripe microstructures is in the range of 10 μm to 1,000 μm.

6. The anti-peeping privacy device according to claim 1, wherein the width of the concave-convex stripe microstructures is in the range of 10 μm to 1,000 μm.

7. The anti-peeping privacy device according to claim 1, wherein the height of the concave-convex stripe microstructures is in the range of 10 μm to 1,000 μm.

8. The anti-peeping privacy device according to claim 1, where the cross-sectional shape of the concave-convex stripe microstructures is selected from the group consisting of triangular, semicircle, semi-elliptical, quadrilateral and a combination thereof.

9. The anti-peeping privacy device according to claim 1, where the liquid crystal material of the liquid crystal layer is a photopolymerizabie liquid crystal.

10. The anti-peeping privacy device according to claim 1, where the polarizing element is a polarizer.

* * * * *